United States Patent [19]

Larmon

[11] Patent Number: 5,038,841
[45] Date of Patent: Aug. 13, 1991

[54] RADIUS CUTTING APPARATUS AND METHOD

[76] Inventor: James Larmon, 605 Ojai Rd., Santa Paula, Calif. 93060

[21] Appl. No.: 538,271

[22] Filed: Jun. 14, 1990

[51] Int. Cl.⁵ .............................................. B27C 5/10
[52] U.S. Cl. ................................. 144/371; 33/27.03; 144/1 F; 144/134 D; 144/136 C; 83/574
[58] Field of Search ............... 409/182; 144/1 F, 1 E, 144/134 R, 134 D, 136 C, 137, 2 N, 371; 83/490, 574; 33/27.03, 27.04; 30/310

[56] References Cited

U.S. PATENT DOCUMENTS

| 2,804,104 | 8/1957 | Sasso | 83/574 |
|---|---|---|---|
| 3,478,788 | 11/1969 | Zelik | 144/134 D |
| 3,635,268 | 1/1972 | Lange | 144/134 D |
| 4,023,273 | 5/1977 | Treleaven | 30/373 |
| 4,044,464 | 8/1977 | Schiess et al. | 30/164.9 |
| 4,143,691 | 3/1979 | Robinson | 144/134 D |
| 4,281,694 | 8/1981 | Gorman | 144/134 D |
| 4,306,598 | 12/1981 | Peot | 144/136 C |
| 4,685,496 | 8/1987 | Livick | 144/1 F |
| 4,718,468 | 1/1988 | Cowman | 144/134 D |
| 4,913,206 | 4/1990 | Altinbasak | 144/136 C |

Primary Examiner—W. Donald Bray
Attorney, Agent, or Firm—Pretty, Schroeder, Brueggemann & Clark

[57] ABSTRACT

A cutting guide mates with a variety of types and brands of power tools and quickly and easily allows circular cuts to be made in sheets of wood. The cutting guide is attached to a radius arm such as a length of two-by-four lumber that defines the circle. The cutting guide is provided with adjustment for varying the radius of the circular cuts, which can also be varied by appropriate selection of the radius arm length.

13 Claims, 2 Drawing Sheets

RADIUS CUTTING APPARATUS AND METHOD

BACKGROUND OF THE INVENTION

1. Field of the Invention

This invention relates generally to woodcutting tools and, more particularly, to adjustable guides for power tools.

2. Description of the Related Art

A carpenter typically has wood-cutting power tools available at a work site that include a router capable of milling shapes out of wood and a circular saw capable of cutting straight through wood. These power tools are usually held by the carpenter and guided free-hand along the surface of a workpiece. The tools often include edge guides that extend laterally from the tool, for use in making straight cuts parallel to a straight edge of the wood. It is sometimes desirable to make circular cuts in wood workpieces, such as when making an archway or framing a curved window.

To make a circular cut, a carpenter often simply uses a string and pencil to draw a line on the sheet of wood that conforms to the radius of the desired arc, and then carefully guides the router or circular saw free-hand along the drawn line. This is a time-consuming and awkward task that makes it difficult to produce accurate, consistent circular cuts. The length of string might not be accurately measured or held steady, throwing off the drawn line, or the carpenter might stray from the drawn line, leaving distinct curve segments rather than a smooth arc. The quality of the circular cut is therefore highly dependent on the skill of the particular carpenter.

Cutting guides have been provided to assist carpenters in using power tools to make circular cuts in sheets of wood. Many of these guides are complicated mechanisms that are difficult to construct and to utilize, limiting their usefulness. They are often difficult to set up and can be cumbersome and heavy to transport from job to job or around a job site. Some cutting guides of this kind can be used for routers or for saws, but not for both. This could require a carpenter to obtain a different guide for each type of power tool used, again limiting the guide's usefulness.

It should therefore be appreciated that there is a need for a cutting guide that can be used for making circular cuts in sheets of wood and that can be used with both routers and saws. The present invention satisfies this need.

SUMMARY OF THE INVENTION

The present invention provides an easy-to-use cutting guide that can be fitted to power tools, including routers and saws, for making circular cuts in a workpiece without complicated mechanisms or attachments. The cutting guide allows the power tool to be moved in a smooth arc along the proper radius. One end of the cutting guide is attached to the power tool and the opposite end accepts a radius arm that, along with the cutting guide, defines the radius of the circle to be cut. The radius arm is pivotably attached to a flat work table against which the workpiece is placed, and sweeps the power tool through an arc of the desired radius. The power tool is adjustably positioned on the cutting guide such that the distance from the pivot point of the radius arm to the cutting blade of the power tool is the desired radius to be cut. The carpenter simply switches on the power tool and uses the cutting guide to pivot the radius arm and trace out a circular cut.

The radius arm can advantageously be a piece of lumber that is commonly referred to as a two-by-four, which is of standard dimensions and is readily available at most work sites. The two-by-four can be pivotably attached at a first end to the work table by using an eight-penny nail, also readily available at most work sites, driven through the two-by-four into the work table such that the second end of the two-by-four rotates through a curve. The cutting guide is attached to the second end of the radius arm. A two-by-four is a much more precise and stable means of tracing out a curve than is a piece of string, and the carpenter is thereby provided with a reliable means of following the intended arc. Using a two-by-four eliminates the need for specialized tools and complicated mechanisms for defining the desired curve.

The power tool can be variably positioned on the cutting guide to vary the radius of the curve. In this way, multiple concentric circular cuts can be made without moving the pivot point of the radius arm or changing the arm itself, helping to provide more accurate and reliable cuts. The length of the radius arm can be selected to provide a large variation in the radius of curves to be cut. Concentric cuts can be made, even with different radius arms, as long as the pivot point of the arms remains unchanged.

The cutting guide preferably includes a pair of mounting rails that mate with the bottom portion of a router. A saw adaptor can be provided to allow the mounting rails to mate with a saw, such as a circular saw. Thus, the cutting guide has great flexibility to mate with a variety of power tools.

Other features and advantages of the present invention should be apparent from the following description of the preferred embodiment, which illustrates by way of example the principles of the invention.

DESCRIPTION OF THE PREFERRED EMBODIMENT

The following description of the preferred embodiment of the invention is not to be taken in a limiting sense, but is made merely for the purpose of illustrating the general principles of the invention. The following detailed description is of the best presently contemplated mode of carrying out the present invention.

Figure 1:
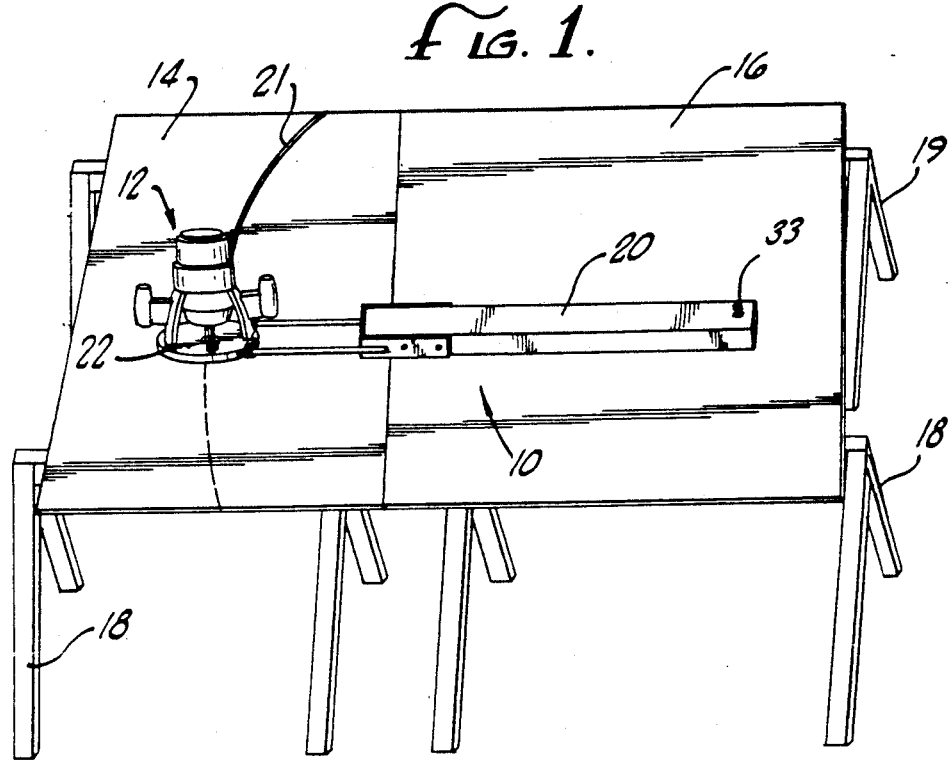
FIG. 1 is a perspective view of a router attached to a cutting guide in accordance with the present invention.

With reference now to the drawings, and particularly to FIG. 1, there is shown a cutting guide 10 constructed in accordance with the present invention, for guiding a router 12 as it makes a circular cut in a workpiece 14 such as a sheet of plywood. The cutting guide is attached to a flat work table 16, for example a sheet of plywood, which is supported, along with the workpiece, above a floor by a pair of sawhorses 18 and 19. A radius arm 20 substantially defines the radius of a curved line 21 along which the router will cut. The radius arm illustrated in FIG. 1, for example, is a length of commonly available lumber referred to as a two-by-four.

Figure 2:
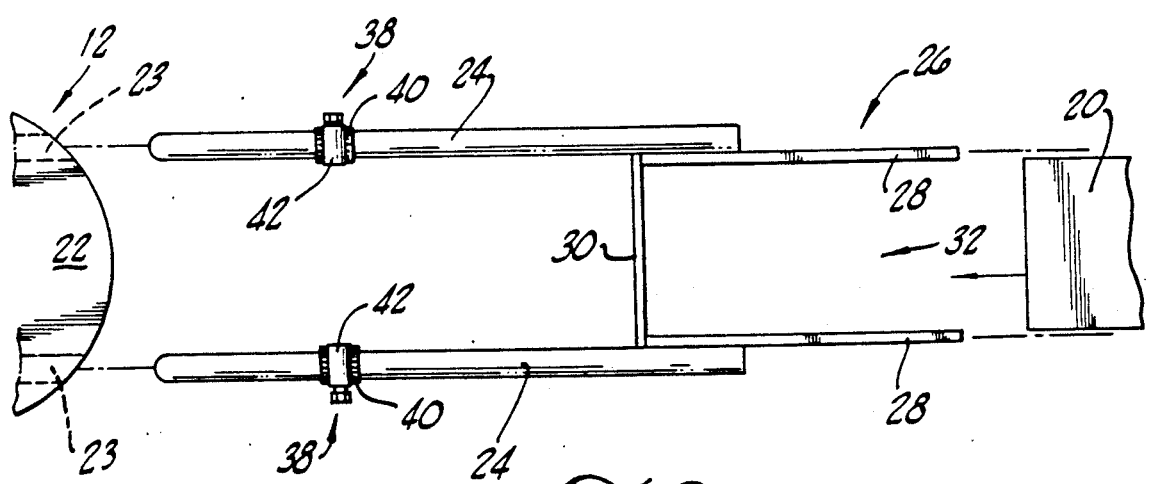
FIG. 2 is a plan view of the cutting guide of FIG. 1 with the router removed.
Figure 3:
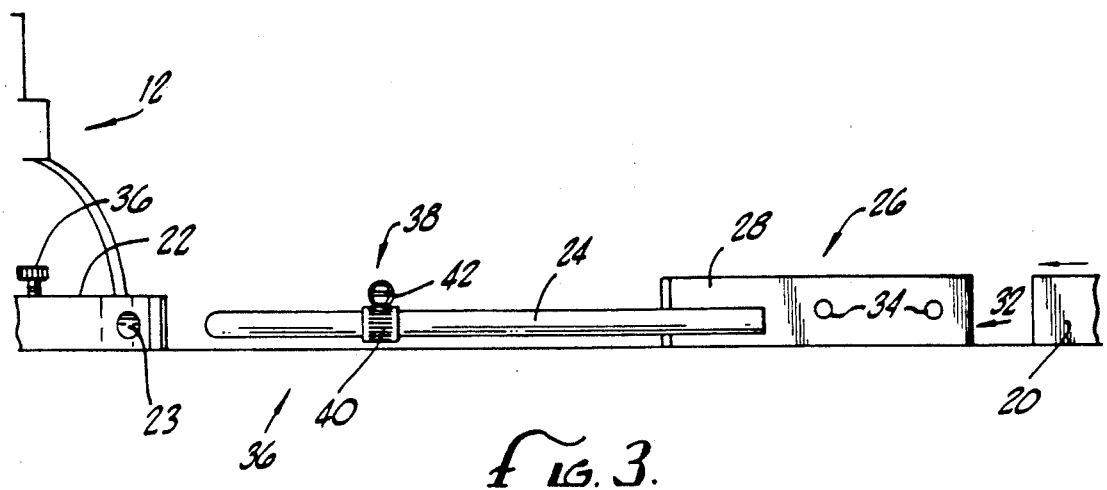
FIG. 3 is a side view of the cutting guide of FIG. 2.

The cutting guide 10 is shown in plan view and side view in FIGS. 2 and 3, respectively. A router 12 such as that illustrated in FIG. 1 includes a lower plate 22 with two parallel bores 23 passing through. The parallel bores accept a straight edge cutting extension (not illustrated) for milling straight cuts parallel to a straight edge of the workpiece 14. The cutting guide includes a pair of mounting rails 24 that are spaced apart the same distance as the router's parallel bores and that have approximately the same diameter as the straight edge cutting extension. For example, the "MAKITA" brand router Model 3612BR has parallel bores with a maximum outside spacing from edge to edge of five inches and a diameter of twelve millimeters. The mounting rails therefore are spaced approximately five inches apart and have a diameter of approximately twelve millimeters. The mounting rails are preferably constructed of cold-rolled steel.

The mounting rails 24 are attached to a radius arm adaptor 26 comprising a pair of parallel steel side plates 28 that are spaced apart by an end plate 30 such that the side plates and end plate form a throat 32 that accepts the two-by-four radius arm 20, which has a cross-sectional size of approximately 1 and ½ inches high by 3 and ½ inches wide. That is, the side plates are spaced 3 and ½ inches apart by the end plate, and are approximately 1 and ½ inches tall. A thickness of approximately ¼ inches is used for the side plates and end plate to provide the desired strength and rigidity. Each side plate 28 includes a pair of screw holes 34 into which a pair of screws (not illustrated) can be threaded for securely fastening the arm adaptor 26 to the radius arm 20.

The radius arm 20 is pivotably fastened to the work table 16 at its end opposite the radius arm adaptor 26 by an eight-penny nail 33 that is commonly available at construction job sites. That is, the eight-penny nail is driven through the two-by-four radius arm into the work table, and the radius arm thereby allows the cutting guide 10 and router 12 to be rotated in a circle about the nail. Thus, the radius arm defines the arc in which the power tool will be rotated, and substantially defines the radius of the circular cut. The radius arm can remain attached to the work table between cuts in successive workpieces and thereby increases the accuracy and reliability of successive cuts.

As noted, the mounting rails 24 can be inserted through the bores 23 in the lower plate 22 of a router 12. The router can slide along the mounting rails, and is fixed in place on the rails by router thumbscrews 36 extending through the lower plate of the router. That is, the router is provided with a thumbscrew 36 for each one of the parallel bores 23 passing through the router's lower plate 22. The thumbscrews are ordinarily used to lock down the aforementioned straight edge cutting extension, but are used in conjunction with the cutting guide 10 of the present invention to lock the router in place on the mounting rails. After the router is in its desired position on the mounting rails, the thumbscrews are tightened down into frictional engagement with the mounting rails, thereby holding the router in place relative to the mounting rails.

A rail stop 38 is provided on each mounting rail 24 to perform a positioning function. The rail stop illustrated in FIG. 2 and FIG. 3, for example, comprises a hose clamp of appropriate size. As known to those skilled in the art, a hose clamp includes a slotted band 40 whose ends are threaded into engagement with a screw barrel portion 42 thereby defining a circle. As the screw barrel portion is operated, the diameter of the slotted band is decreased. Alternate configurations of rail stops can be used without departing from the teachings of the invention. For example, a sleeve with a thumbscrew that can be tightened onto the rails can be used. Such an arrangement, however, is generally heavier and more expensive than the hose clamps illustrated and is not preferred. The rail stops 38 are tightened into place on the respective mounting rail 24 and thereby establish a fixed location that the router 12 can be returned to even after removal from the rails, such as for changing tools or cutting blades. Therefore, circular cuts of the proper dimension are ensured. When each rail stop 38 is tightened down onto its respective mounting rail 24, the rail stop 38 is held firmly in place, fixing the router in place on the rails. Thus, the rail stops hold the router in a fixed position relative to the radius arm adaptor 26.

Two rail stops 38 can be provided on each rail for placement on opposite sides of the router to fix two router locations. For example, a pair of rail stops can be located near the end plate 30 to define a circle of a first radius, and another pair of rail stops can be located farther away from the end plate, thereby defining a circle having a second, larger radius. Alternatively, the router can be positioned to abut the end plate 30 on one side, thereby defining a circle having a first radius, in which case only a single rail stop per rail is necessary to fix the second radius. In this way, some amount of adjustment can be provided by moving the rail stops along the mounting rails. In particular, several concentric cuts can be made in the workpiece 14 without moving the radius arm's pivot point, defined by the nail 33, by moving the rail stops along the rails and noting the positions in which the stops are located for each cut. Thus, the apparatus 10 can maintain the exact same geometric center for each of the cuts. This increases the accuracy and reliability of the successive concentric cuts.

The mounting rails 24 can be attached to the adaptor 26 by welding, preferably at a point on the outside surface of the adaptor side plates 28 such that the lower outside surface of the lower plate 22 of the router 12 is flush with the lower edge of the adaptor side plates 28. In this way, the cutting guide 10 can rest flat on the work table 16 or workpiece 14 with the rail stops 38 in place as the power tool is moved along the desired arc. The rail stops are advantageously above the surface of the work table or workpiece, decreasing the chance that they will be dislodged from their position due to contact with the table or workpiece.

Figure 4:
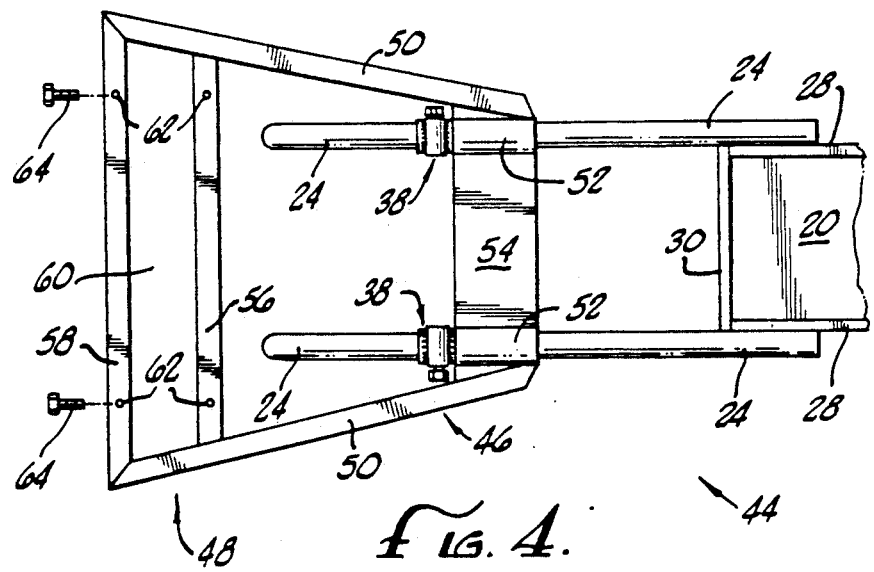
FIG. 4 is a plan view of an adaptor to mate with a circular saw.

The saw adaptor 44 illustrated in FIG. 4 allows the cutting guide to accept a circular saw, such as the "SKILSAW" brand of saw, Model No. 77, known to those skilled in the art. The saw adaptor includes an adaptor portion 46 and an attachment portion 48. The adaptor is constructed from steel of approximately 1 inch by ½ inch hollow bars, and includes side plates 50 and a pair of hollow rail tubes 52. The rail tubes and side plates are spaced apart by a bracket plate 54 and have an inside diameter so as to accept the mounting rails 24. The rail tubes are mounted on the top surface of the bracket plate, and are approximately three inches in length for sufficient stability in holding the mounting rails. The attachment portion 48 of the saw adaptor 44 includes two parallel bars 56 and 58 extending between the side plates 50. The bars form an open area, or blade window 60, providing an opening through which the blade of the circular saw (not illustrated) can pass. Four bolt holes 62 are provided in the parallel bars, two in each bar, that accept bolts 64 passing through corresponding bolt holes in the circular saw body. The bolts securely attach the saw to the saw adaptor.

The saw adaptor 44 position is established on the mounting rails 24 with a pair of outside rail stops 38. After the saw adaptor is in position on the mounting rails, the outside stops are slipped onto the rails and tightened into frictional contact with the rails, thereby holding the saw adaptor in place relative to the mounting rails. The saw or other suitable power tool can then be attached to the adaptor and, once the radius arm is in place, circular cuts can be made.

The cutting guide described above provides a reliable means of making accurate circular cuts in a workpiece without relying on the carpenter's ability to make freehand cuts. The cutting guide itself is of simple construction that is easy to manufacture. The cutting guide is easy to use and, being lightweight, is easy to carry from job to job or around a job site. With the saw adaptor, the cutting guide can be used for both routers and circular saws, eliminating the need for acquiring two cutting guides for the two tools.

While the present invention has been described with respect to a preferred embodiment, it is to be understood that variations may occur to those skilled in the art. The materials used in constructing a cutting guide, for example, can be varied without departing from the teachings of the present invention. The invention, therefore, should not be seen as limited to the particular apparatus described herein, but it should be understood that the present invention has wide applicability with respect to cutting guides of different configurations. Such alternate configurations can be achieved by those skilled in the art in view of the description herein.

I claim:

1. A cutting guide for making circular cuts, to be sued with a power tool having a mounting plate with bores and with a radius arm that defines the radius of the circular cuts, the cutting guide comprising:
    mating means for mating with a first type of power tool, the mating means comprising a pair of parallel rails that are spaced apart to accept the bores of the power tool's mounting plate;
    radius arm adaptor means attached to the mating means for attaching to the radius arm, the radius arm adaptor means comprising a pair of parallel metal plates spaced apart so as to form a mounting throat that is sized to accept the radius arm.

2. A power tool cutting guide as recited in claim 1, wherein the mounting throat is sized to accept a radius arm that comprises a two-by-four piece of lumber.

3. A power tool cutting guide as recited in claim 1, further comprising saw adaptor means for attaching to the mating means and for mating with a second type of power tool different from the first.

4. A power tool cutting guide as recited in claim 3, wherein the saw adaptor means includes a mounting plate having an opening through which extends the cutting blade of the second type of power tool 5. A power tool cutting guide for making circular cuts in sheets of wood and for use with a rigid radius arm that substantially defines the radius of the circular cuts, the power tool cutting guide comprising:
    a radius arm adaptor including a radius arm throat that is sized to accept the radius arm;
    a power tool adaptor, attached to the radius arm adaptor, that accepts a power tool that can make cuts i the sheets of wood and that supports the power tool in a fixed relationship with the radius arm adaptor; and
    fixation means attached to the power tool adaptor for holding the power tool on the power tool adaptor in a fixed position relative to the radius arm adaptor.

6. A power tool cutting guide as recited in claim 5, wherein the power tool adaptor comprises a pair of rigid, longitudinally extending rods and the fixation means comprises a pair of clamps that each slide on one of the rods and can be frictionally fixed in position on the rods.

7. A power tool cutting guide as recited in claim 5, further comprising a saw adaptor attached to the power tool adaptor, the saw adaptor including mounting means for accepting a circular saw power tool and for holding it in a fixed position relative to the power tool adaptor.

8. A cutting guide for making circular cuts in sheets of wood with a radius arm and a power tool having mounting bores, the power tool cutting guide comprising;
    a pair of mounting rails that are spaced apart an amount equal to the dimensions of the power tool's mounting bores and that have a diameter approximately equal to the inside diameter of the mounting bores;
    a pair of parallel steel side plates spaced apart so as to form a radius arm throat that is sized to accept one end of the radius arm, one of the mounting rails being attached to each side plate in an orientation parallel to the radius arm; and
    a rail stop slidably attached to each mounting rail.

9. A power tool cutting guide as recited in claim 8, wherein each rail stop includes a slotted band formed into a circle by a screw portion adapted to engage the ends of the band such that the rail stop slides along its respective mounting rail and is securely fixed in place by engaging the screw portion to decrease the size of the circle and the band is tightened against the mounting rail.

10. A power tool cutting guide as recited in claim 8, further comprising a saw adaptor that accepts a circular saw and that can be securely attached to the mounting rails.

11. A power tool cutting guide as recited in claim 10, wherein the saw adaptor includes a pair of hollow rail tubes that accept the mounting rails and a mating frame that mates the cutting guide to a circular saw.

12. A method of making circular cuts in a workpiece comprising a sheet of wood with a power tool that includes mounting bores, on a work table with a radius arm having a first end and a second end that substantially defines the radius of the circular cuts, the method comprising the steps of:
    providing a power tool cutting guide for use with a first power tool, the cutting guide including
        a pair of mounting rails spaced apart an amount equal to the dimensions of the mounting bores of the first power tool and having a diameter approximately equal to the inside diameter of the mounting bores,
        a pair of parallel side plates spaced apart by a bridge plate so as to form a radius arm throat, one of the mounting rails being attached to each side plate, and a rial stop slidably attached to each mounting rail;

inserting the first end of the radius arm into the radius arm throat;

pivotably attaching the second end of the radius arm to the work table, thereby defining the center of the circular cut;

attaching the power tool to the mounting rails of the power tool cutting guide;

fixing the position of the first power tool on the mounting rails by frictionally engaging the rail stops to their respective mounting rail;

placing the workpiece adjacent the work table; and switching on the first power tool and rotating the tool in the arc defined by the radius arm and cutting guide, thereby producing a circular cut in the workpiece.

13. A method of cutting circles in a workpiece as recited in claim 12, further comprising the step of providing a power tool adaptor that can be attached to the mounting rails and that accepts a second power tool different from the first.

* * * * *